(12) United States Patent
Hirabayashi

(10) Patent No.: US 10,712,462 B2
(45) Date of Patent: Jul. 14, 2020

(54) METHOD AND SYSTEM FOR WAVEFIELD SEPARATION OF SONIC DATA USING CROSS-CORRELATION

(71) Applicant: Schlumberger Technology Corporation, Sugar Land, TX (US)

(72) Inventor: Nobuyasu Hirabayashi, Yokohama (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 220 days.

(21) Appl. No.: 15/886,954

(22) Filed: Feb. 2, 2018

(65) Prior Publication Data

US 2018/0231680 A1    Aug. 16, 2018

Related U.S. Application Data

(60) Provisional application No. 62/458,145, filed on Feb. 13, 2017.

(51) Int. Cl.
| | | |
|---|---|---|
| *G01V 1/36* | (2006.01) | |
| *G01V 1/40* | (2006.01) | |
| *G01V 1/28* | (2006.01) | |

(52) U.S. Cl.
CPC .............. *G01V 1/366* (2013.01); *G01V 1/288* (2013.01); *G01V 1/40* (2013.01); *G01V 2210/242* (2013.01); *G01V 2210/34* (2013.01)

(58) Field of Classification Search
None
See application file for complete search history.

(56) References Cited

U.S. PATENT DOCUMENTS

| | | | |
|---|---|---|---|
| 5,191,557 A * | 3/1993 | Rector | G01V 1/375 367/41 |
| 6,308,137 B1 | 10/2001 | Underhill et al. | |
| 2015/0081223 A1* | 3/2015 | Williams | G01V 1/288 702/14 |
| 2017/0248721 A1* | 8/2017 | Poole | G01V 1/36 |
| 2017/0269246 A1* | 9/2017 | Anderson | G01V 1/362 |

OTHER PUBLICATIONS

Hirabayashi et al., "Wavefield separation for borehole acoustic reflection surveys using parametric inversion" SEG Las Vegas 2008 Annual Meeting (Year: 2008).*
Rector et al., "Use of drill-bit energy as a downhole seismic source" SEG Technical Program Expanded Abstracts (1988): 161-164 (Year: 1988).*
Wu et al., "Borehole seismic modeling with inclusion of tube waves and other tube-wave-related arrivals" SEG Technical Program Expanded Abstracts (2003) (Year: 2003).*

(Continued)

*Primary Examiner* — John C Kuan
(74) *Attorney, Agent, or Firm* — Eileen Pape

(57) ABSTRACT

A method for wavefield separation of sonic data is provided. The method comprises estimating direct phases of waveforms of sonic data observed with two or more sensors by using cross-correlation of waveform traces at adjacent sensor locations, removing the direct phases from the observed waveforms, and extracting event signals from the waveforms after removing the direct phases.

12 Claims, 10 Drawing Sheets

(56) References Cited

OTHER PUBLICATIONS

Hornby, B. E., "Imaging near-borehole of formation structure using full-waveform sonic data": Geophysics, vol. 54, No. 6, Jun. 1989, pp. 747-757.
Li, Y., R. Zhou, X. M. Tang, J. C. Jackson, and D. Patterson, 2002, "Single-well imaging with acoustic reflection survey" at Mounds, Oklahoma, USA: 64th Conference & Exhibition, EAGE, Paper P141, Florence, Italy, May 27-30, 2002 (4 pages).
Tang, X. M., "Predictive processing of array acoustic waveform data": Geophysics, vol. 62, No. 6, (Nov.-Dec. 1997), pp. 1710-1714.
Lang, S. W., A. L. Kurkjian, J. H. McClellan, C. F. Morris, and T. W. Parks, 1987, "Estimating slowness dispersion from arrays of sonic logging waveforms": Geophysics, vol. 52, No. 4, Apr. 1987, pp. 530-544.
Haldorsen, J., W. Borland, H. A. B. Al Rougha, A. Sultan, and R. Meehan, 2005, "Azimuthal sonic imaging": 67th Conference & Exhibition, EAGE, Madrid, Spain, Jun. 13-16, 2005, Paper I-017 (4 pages).
Hsu, K., and S. K. Chang, 1987, "Multiple-shot processing of array sonic waveforms": Geo-physics, vol. 52, No. 10, (Oct. 1987), pp. 1376-1390.
Kimball, C. V., and T. L. Maretta, 1984, "Semblance processig of borehole acoustic array data": Geophysics, vol. 49, No. 3, (Mar. 1984), pp. 274-281.

\* cited by examiner

METHOD AND SYSTEM FOR WAVEFIELD SEPARATION OF SONIC DATA USING CROSS-CORRELATION

CROSS-REFERENCE TO RELATED APPLICATIONS

The present document is based on and claims priority to U.S. Provisional Application Ser. No. 62/458,145 filed Feb. 13, 2017, which is incorporated herein by reference in its entirety.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art. The following descriptions and examples are not admitted to be prior art by virtue of their inclusion in this section.

The present disclosure relates generally to methods and systems for performing a wavefield separation of sonic data using cross-correlation. In particular, the present disclosure relates to methods and systems to obtain event signals of reflected and transmitted waves of sonic data in oil and gas industries.

Event signals are extracted from observed waveforms of sonic data by estimating and subtracting direct phases. In general, the direct phases in a waveform trace are predicted by examining signals in adjacent traces that form a common moveout curve in a set of waveform traces (waveform trace gather). There are selections of grouping and sorting methods of waveform traces for a wavefield separation as same as for the conventional processing of sonic data. The common offset gather (COG) is a set of traces whose source and receiver distance is constant. In this gather, Hornby (1989) applied a f-k filter to remove the direct phases and unwanted reflected waves (such as reflected Stoneley waves) as described in the document of Hornby, B. E., 1989, "Imaging near-borehole of formation structure using full-waveform sonic data": Geophysics, 54, pp. 747-757. Li et al. (2002) applied a median filter after correcting P-waves arrivals as described in the document of Li, Y., R. Zhou, X. M. Tang, J. C. Jackson, and D. Patterson, 2002, "Single-well imaging with acoustic reflection survey" at Mounds, Okla., USA: 64th Conference & Exhibition, EAGE, Paper P141. The common shot gather (CSG, receiver section) is a set of traces of a common source location and multiple receiver locations. Tang (1997) separated direct phases using the parametric estimation of direct phases (for example Lang et al. (1987)) as described in the documents of Tang, X. M., 1997, "Predictive processing of array acoustic waveform data": Geophysics, 62, pp. 1710-1714, and Lang, S. W., A. L. Kurkjian, J. H. McClellan, C. F. Morris, and T. W. Parks, 1987, "Estimating slowness dispersion from arrays of sonic logging waveforms": Geophysics, 52, pp. 530-544. Haldorsen et al. (2005) applied the adaptive interference canceller (AIC) filter as described in the document of Haldorsen, J., W. Borland, H. A. B. Al Rougha, A. Sultan, and R. Meehan, 2005, "Azimuthal sonic imaging": 67th Conference & Exhibition, EAGE, Paper 1-017. The common receiver θgather (CRG, source section) of Hsu and Chang (1987) and Tang (1997) is a set of traces of a common receiver location and multiple shot locations as described in the document of Hsu, K., and S. K. Chang, 1987, "Multiple-shot processing of array sonic waveforms": Geo-physics, 52, 1376-1390, and the document of Tang (1997). As the directions of moveout curves of reflected event signals in CSG and COG are opposite whereas those of direct phases are common, the event signals can be effectively extracted by switching these gathers so that the directions of moveout curves of event signals become opposite to those of direct phases (Tang (1997)). Note that the contents of the foregoing documents of Hornby (1989), Li et al. (2002), Tang (1997), Lang et al. (1987), Haldorsen et al. (2005) and Hsu and Chang (1987) are incorporated herein in their entirety by reference thereto.

There is a need, however, for improving the accuracy of estimation of direct phases to obtain the event signals.

SUMMARY OF THE DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect of the present disclosures, a method for wavefield separation of sonic data comprises estimating direct phases of waveforms of sonic data observed with two or more sensors by using cross-correlation of waveform traces at adjacent sensor locations, removing the direct phases from the observed waveforms, and extracting event signals from the waveforms after removing the direct phases.

In another aspect of the present disclosures, a system for wavefield separation of sonic data comprises a memory to record sonic data and a processor. The processor is used to estimate direct phases of waveforms of sonic data observed with two or more sensors by using cross-correlation of waveform traces at adjacent sensor locations, remove the direct phases from the observed waveforms, and extract event signals from the waveforms after removing the direct phases.

In the method and system of the disclosure herein, the direct phases of waveforms may be approximated by polynomial fitting. The method may further comprise estimating time differences of phase arrivals to a reference time using cross-correlation of the waveform traces, and estimating the direct phases of waveforms based on the time differences of phase arrivals. The system may be used further to estimate time differences of phase arrivals to a reference time using cross-correlation of the waveform traces, and estimate the direct phases of waveforms based on the time differences of phase arrivals. In the method and system, the time differences of phase arrivals may be estimated by successively applying time shift to the waveform traces and computing cross-correlation for the time shifted waveform traces.

In the method and system of the disclosure herein, a k-f filter may be applied to remove unwanted signals from the waveforms and/or to select up-going or down-going waves from the waveforms. A subterranean structure near a borehole may be analyzed by processing the event signals.

Advantages and novel features of the disclosures will be set forth in the description which follows or may be learned by those skilled in the art through reading the materials herein.

BRIEF DESCRIPTION OF THE DRAWINGS

Embodiments of a downhole apparatus and components thereof according to the disclosures herein are described with reference to the following figures. The same numbers are used throughout the figures to reference like features and components.

DETAILED DESCRIPTION

Figure 1A:
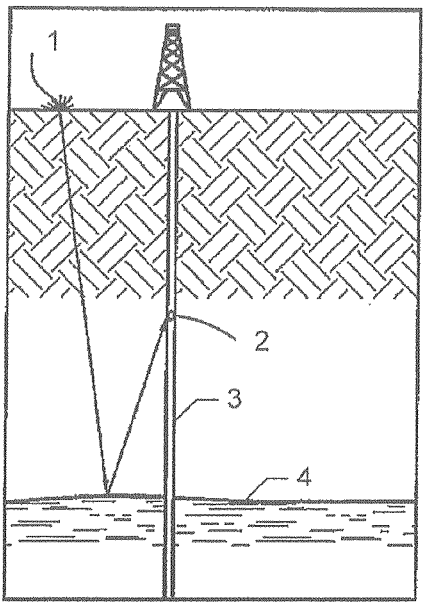
FIGS. 1A-1D show typical seismic-while-drilling tools with one or more transmitters located at the surface according to embodiments of the disclosure.

Illustrative embodiments and aspects of the present disclosure are described below. In the interest of clarity, not all features of an actual implementation are described in the specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having benefit of the disclosure herein.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

As used throughout the specification and claims, the term "downhole" refers to a subterranean environment, particularly in a wellbore. "Downhole tool" is used broadly to mean any tool used in a subterranean environment including, but not limited to, a logging tool, an imaging tool, an acoustic tool, a permanent monitoring tool, and a combination tool.

The signal processing systems and data processing systems herein may be incorporated in tool systems such as wireline logging tools, measurement-while-drilling and logging-while-drilling tools, permanent monitoring systems, sondes, among others. For purposes of this disclosure, when any one of the terms wireline, cable line, slickline or coiled tubing or conveyance is used it is understood that any of the referenced deployment means, or any other suitable equivalent means, may be used with the present disclosure without departing from the spirit and scope of the present disclosure.

Moreover, inventive aspects lie in less than all features of a single disclosed embodiment. Thus, the claims following the Detailed Description are hereby expressly incorporated into this Detailed Description, with each claim standing on its own as a separate embodiment.

Various embodiments incorporating the methods and techniques of this disclosure follow an integrated approach using conventional sonic, ultrasonic and borehole seismic to enable various kinds of measurements such as an evaluation of borehole conditions.

Water, oil and gas are transported through fractures in subsurface or subterranean formations, resulting in the dissolution of certain types of rocks (e.g., limestone and carbonate). In geological terms, subsurface features such as fractures have a strike and a dip, which refer to the orientation or attitude of the feature. The strike of a bed, fault or other feature, including planar features, is a line representing the intersection of that feature with a horizontal plane. The dip is the angle of descent of the feature relative to the horizontal plane. Often, the dip is taken to be perpendicular to the strike. The dissolution process creates openings or caves, known as karst caves around intersections of fractures, and the karst features are expected to follow the dip of the formation due to the contrast solubility of the rocks.

Figure 1B:
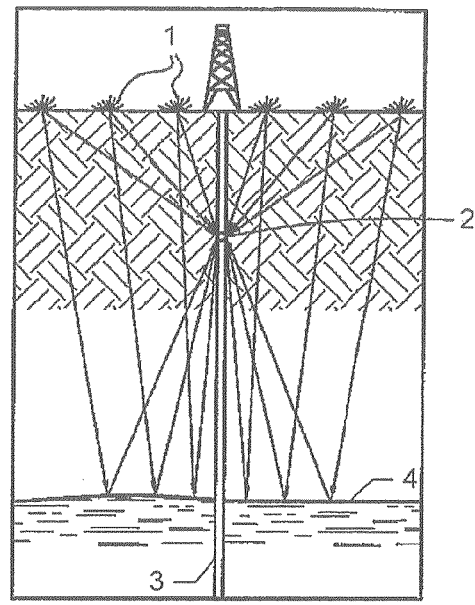
Figure 1C:
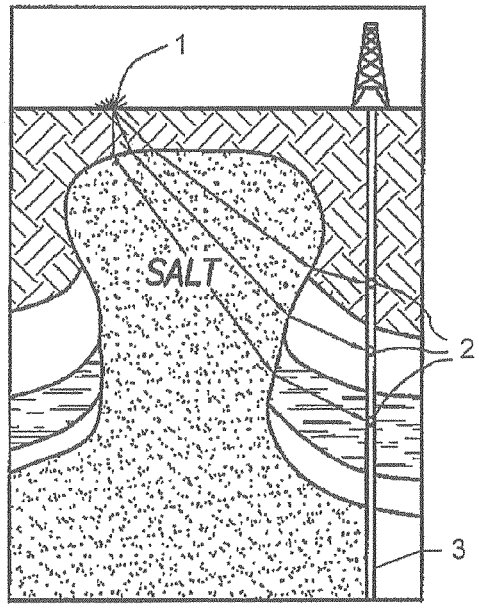
Figure 1D:
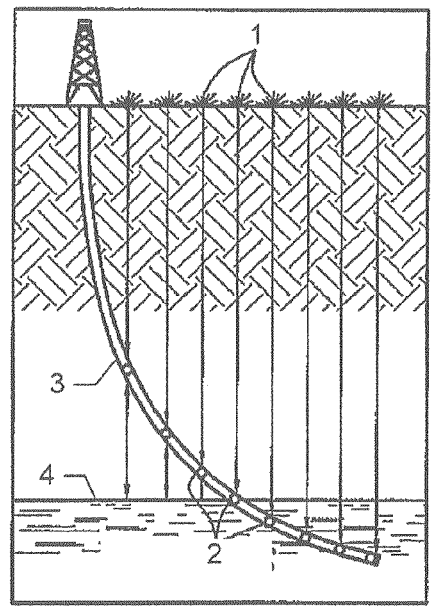

Turning to the figures, FIGS. 1A-1D show typical seismic-while-drilling tools that include one or more transmitters 1 at the surface and one or more receivers 2 in a borehole 3. FIGS. 1A and 1B show that the downhole tool may include a single receiver 2 in the borehole 3. Additionally, FIGS. 1A and 1C show that a single transmitter 1 may be implemented as a single seismic (e.g., signal) source, while FIGS. 1B and 1D show a plurality of transmitters 1 providing respective seismic sources. FIG. 1B shows the receiver 2 receiving reflections and direct signals from the transmitters 1, while FIGS. 1C and 1D show multiple receivers 2 receiving signals directly from the one or more transmitters 1.

Seismic images may be generated from the arrangement of the transmitter(s) 1 and the receiver(s) 2 of FIGS. 1A-1D. FIG. 1A shows a reflection of the signal off a rock boundary layer or a bed boundary 4. The seismic imaging of the bed boundary generates a zero-offset vertical seismic profile arrangement. FIG. 1B shows a reflection of the signals off the bed boundary 4. This seismic imaging generates a walkway vertical seismic profile arrangement. FIG. 1C shows a refraction through salt dome boundaries. This seismic imaging generates a salt proximity vertical seismic profile. FIG. 1D includes signal reflections off the rock layer boundary 4 and/or some direct signals from the transmitter 1. This seismic imaging generates a walk above vertical seismic profile. The vertical profiles and/or arrangements referred to in FIGS. 1A-1D are labeled vertical because the receiver(s) 2 are oriented vertically along the borehole 3.

Furthermore, each receiver(s) 2 may include sensors evenly spaced around the circumference of the receiver. To determine the distance from the tool in the borehole 3 to a first portion of the boundary 4 of a rock layer, the transmitter(s) 1 transmit a first signal. This first signal propagates in all directions through the rock layer. When the signal reaches the boundary 4 of the rock layer, the signal reflects back to the borehole 3. The receiver(s) 2 may then detect the reflected signal. Similarly, a second signal may be transmitted by the transmitter(s) 1 and received by the receiver(s) 2 after reflecting off the boundary 4. The distance to the boundary 4 can be related to the time for the first signal to reach each receiver 2, the distance from each of the receiver(s) 2 to the transmitter 1, and the velocity of the first signal. There may be a separate time-distance relationship for each sensor within the receiver 2 that receives the reflected first signal. Similarly, the time for the second signal to reach each of the receivers 2, the distance from the receivers 2 to the transmitter(s) 1, and the velocity of the signal can be related to the distance to the boundary 4. These relationships may then be combined into a semblance model to calculate the distance to a portion of the boundary 4.

Figure 2:
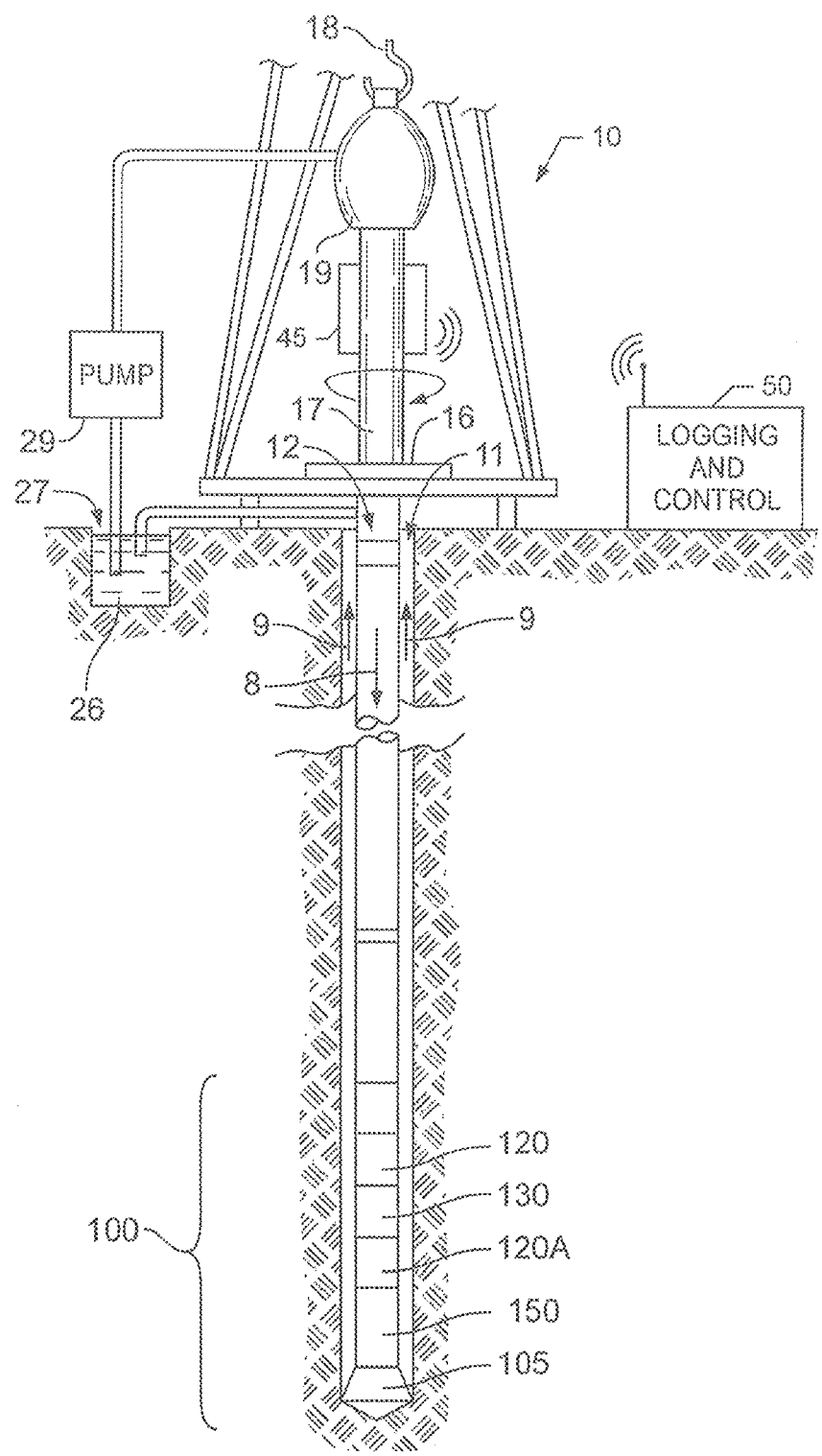
FIG. 2 is a schematic illustration of a wellsite system according to embodiments of the disclosure.

FIG. 2 illustrates a wellsite system in which the present examples can be employed. The wellsite can be onshore or offshore. In this exemplary system, a borehole 11 is formed in subsurface formations by rotary drilling in a manner that is well known. The examples described herein may also use directional drilling, as will be described hereinafter.

A drill string 12 is suspended within the borehole 11 and has a bottomhole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from the hook 18, attached to a traveling block (also not shown), through the kelly 17 and the rotary swivel 19 which permits rotation of the drill string 12 relative to the hook 18. As is well known, a top drive system could alternatively be used.

In this example, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. The drilling fluid lubricates the drill bit 105 and carries formation cuttings up to the surface as it is returned to the pit 27 for recirculation.

Additionally, the wellsite system includes a communications relay 45 and a logging and control processor 50. The example communications relay 45 may receive information and/or data from sensors, transmitters and/or receivers located within the bottomhole assembly 100. The information may be received by the communications relay 45 via a wired communication path through the drillstring 12 and/or via a wireless communication path. The communications relay 45 transmits the received information and/or data to the logging and control processor 50. Additionally, the communications relay 45 may receive data and/or information from the logging control processor 50. Upon receiving the data and/or information, the communications relay 45 may forward the data and/or information to the appropriate sensor(s), transmitter(s) and/or receiver(s) within the bottomhole assembly 100.

The example logging and control processor 50 may include a user interface that enables parameters to be input and/or outputs to be displayed. Additionally, the logging and control processor 50 may control imaging of a fractures or caves (e.g., karst caves) in a subterranean formation. For example, the logging and control processor 50 may position the bottomhole assembly 100 and/or a sonic and/or seismic imaging tool within the borehole 11, instruct transmitters to transmit a signal for receivers and/or sensors to receive.

Additionally, the logging and control processor 50 may calculate a distance from the borehole 11 to a portion of a fracture and/or cave (e.g., an S-S reflection point) based on the transmitted and received signal. While the logging and control processor 50 is depicted uphole at the surface and within the wellsite system, a portion or the entire logging and control processor 50 may be positioned in the bottomhole assembly 100 and/or in a remote location. The logging and control processor 50 is described in greater detail in conjunction with FIG. 9.

The bottomhole assembly 100 of the illustrated example includes a logging-while-drilling (LWD) module 120, a measuring-while-drilling (MWD) module 130, a roto-steerable system and motor 150, and drill bit 105.

The LWD module 120 is housed in a special type of drill collar and can contain one or a plurality of logging tools. Further, more than one LWD and/or MWD module can be employed, e.g. as represented at 120 A. (References, throughout, to a module at the position of 120 can alternatively mean a module at the position of 120 A as well). The LWD module 120 includes capabilities for measuring, processing, and storing information, as well as for communicating with the surface equipment. In this example, the LWD module 120 includes both pressure and sonic measuring devices.

MWD module 130 is also housed in a special type of drill collar and can contain one or more devices for measuring characteristics of the drill string and drill bit. The MWD tool 130 further includes an apparatus (not shown) for generating electrical power to the downhole system. This may typically include a mud turbine generator powered by the flow of the drilling fluid, it being understood that other power and/or battery systems may be employed. In this example, the MWD module 130 includes one or more of the following types of measuring devices: a weight-on-bit measuring device, a torque measuring device, a vibration measuring device, a shock measuring device, a stick slip measuring device, a direction measuring device, and an inclination measuring device.

A particularly advantageous use of the system hereof is in conjunction with controlled steering or directional drilling. In this example, a roto-steerable subsystem 150 (FIG. 2) is provided. Directional drilling is the intentional deviation of the wellbore from the path it would naturally take. In other words, directional drilling is the steering of the drill string so that it travels in a desired direction. Directional drilling is, for example, advantageous in offshore drilling because it enables many wells to be drilled from a single platform. Directional drilling also enables horizontal drilling through a reservoir or cave. Horizontal drilling enables a longer length of the wellbore to traverse the reservoir, which increases the production rate from the well. A directional drilling system may also be used in vertical drilling operations as well. Often, the drill bit will veer off of a planned drilling trajectory because of the unpredictable nature of the formations being penetrated or the varying forces that the drill bit experiences or the geology may not be where it is expected to be. When such a deviation occurs, a directional drilling system may be used to put the drill bit back on course.

Figure 3:
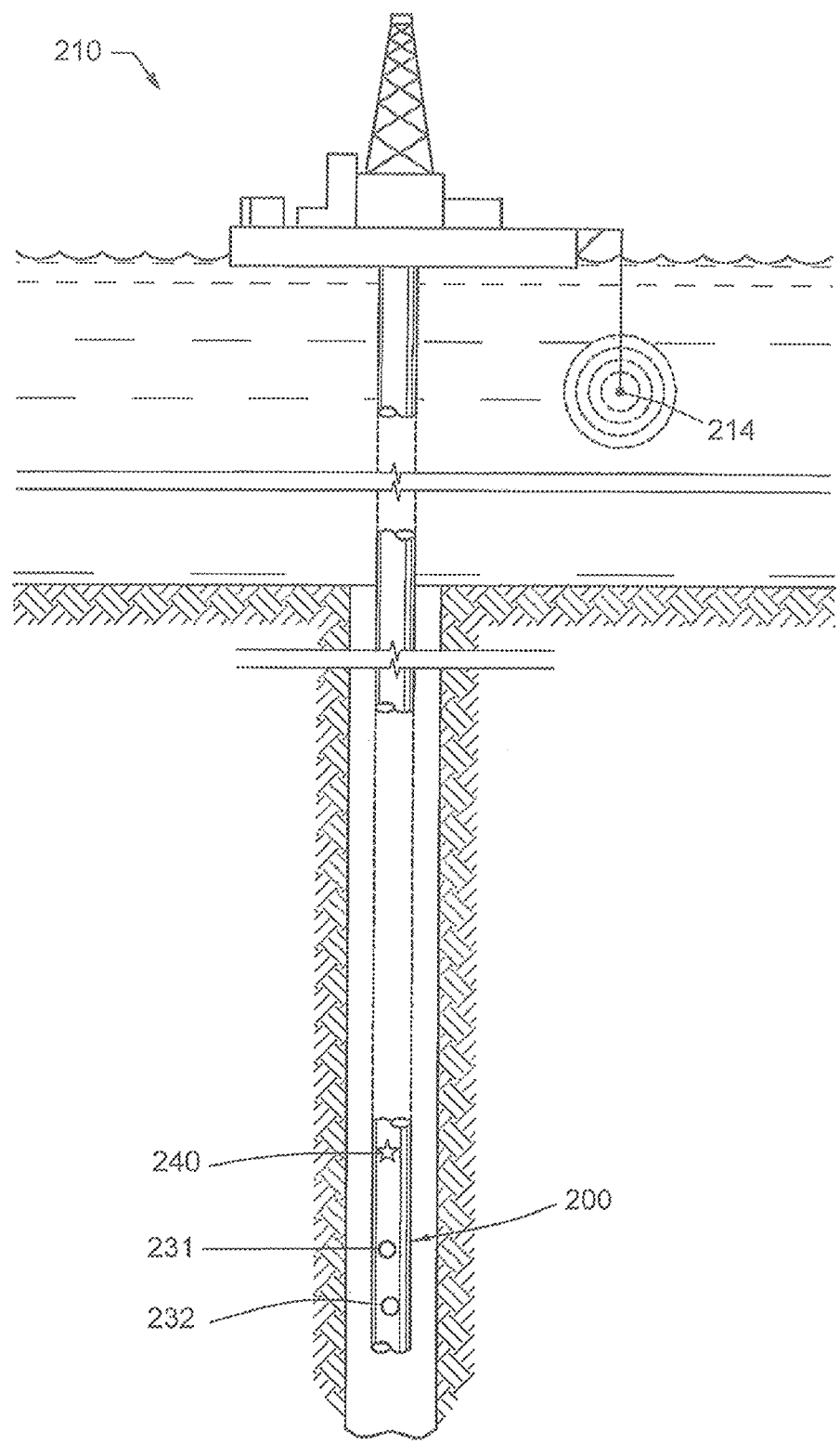
FIG. 3 is a schematic illustration of a sonic logging-while-drilling tool in the wellsite system.

FIG. 3 illustrates a seismic logging-while-drilling tool which can be the LWD tool 120, or can be a part of an LWD tool suite 120A of the type described in U.S. Pat. No. 6,308,137, incorporated herein by reference in its entirety. In the example shown in FIG. 3, an offshore rig 210 is employed, and a seismic transmitting source or array 214 is deployed near the surface of the water. Alternatively, any other suitable type of uphole or downhole source or transmitter can be provided. An uphole processor controls the firing of the transmitter 214. The uphole equipment can also include acoustic receivers and a recorder for capturing reference signals near the source. The uphole equipment further includes telemetry equipment for receiving MWD signals from the downhole equipment. The telemetry equipment and the recorder are typically coupled to a processor so that recordings may be synchronized using uphole and downhole clocks. The downhole LWD module 200 includes at least acoustic receivers 231 and 232, which are coupled to a signal processor so that recordings may be made of signals detected by the receivers in synchronization with the firing of the signal source. Alternatively, a downhole acoustic source 240 can be provided as is further described herein.

Figure 4:
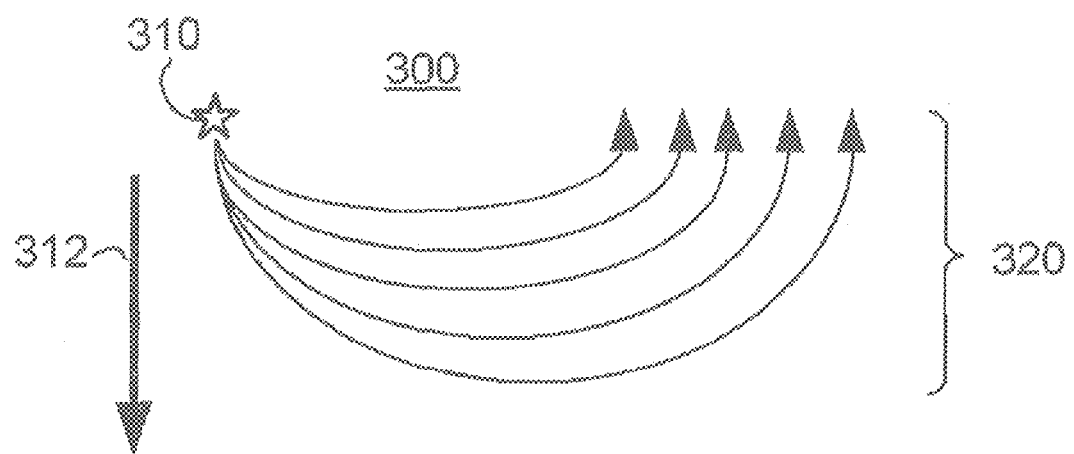
FIG. 4 illustrates the mechanism of refraction in a gradually changing medium.

Energy waves can be returned back towards a tool or other source though the mechanism of refraction. FIG. 4 illustrates the mechanism of refraction in a gradually changing medium. Medium 300 has a gradually and continuously increasing velocity profile in the direction of arrow 312. Acoustic source 310 emits acoustic energy along ray paths 320. Because the medium velocity is gradually increasing, the ray paths are curved as shown in FIG. 4. However, in many downhole situations the velocity profile is not gradually increasing but, rather there is a distinct interface.

Figure 5:
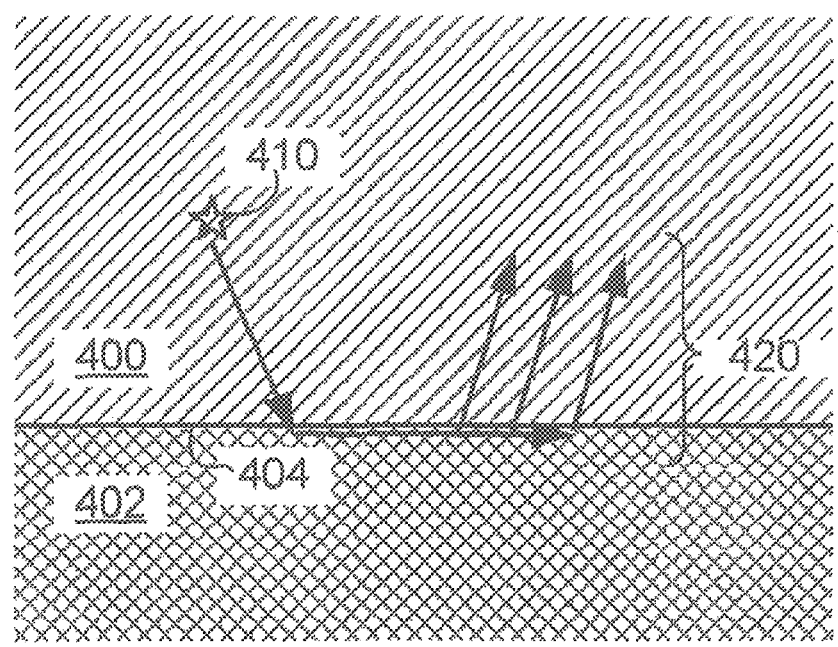
FIG. 5 illustrates the mechanism of refraction in the case of a nearby interface.

FIG. 5 illustrates the mechanism of refraction in the case of a nearby interface. Medium 400 has lower velocity than medium 402, the two media being separated by an interface 404. Due to the interface 404, energy from source 410 travels along the interface 404 in the form of headwaves, as shown by ray paths 420. Thus, where a well sits in the lower velocity medium and a higher velocity medium lies very nearby, this model of refracted energy can be used to analyze the data.

Figure 6A:
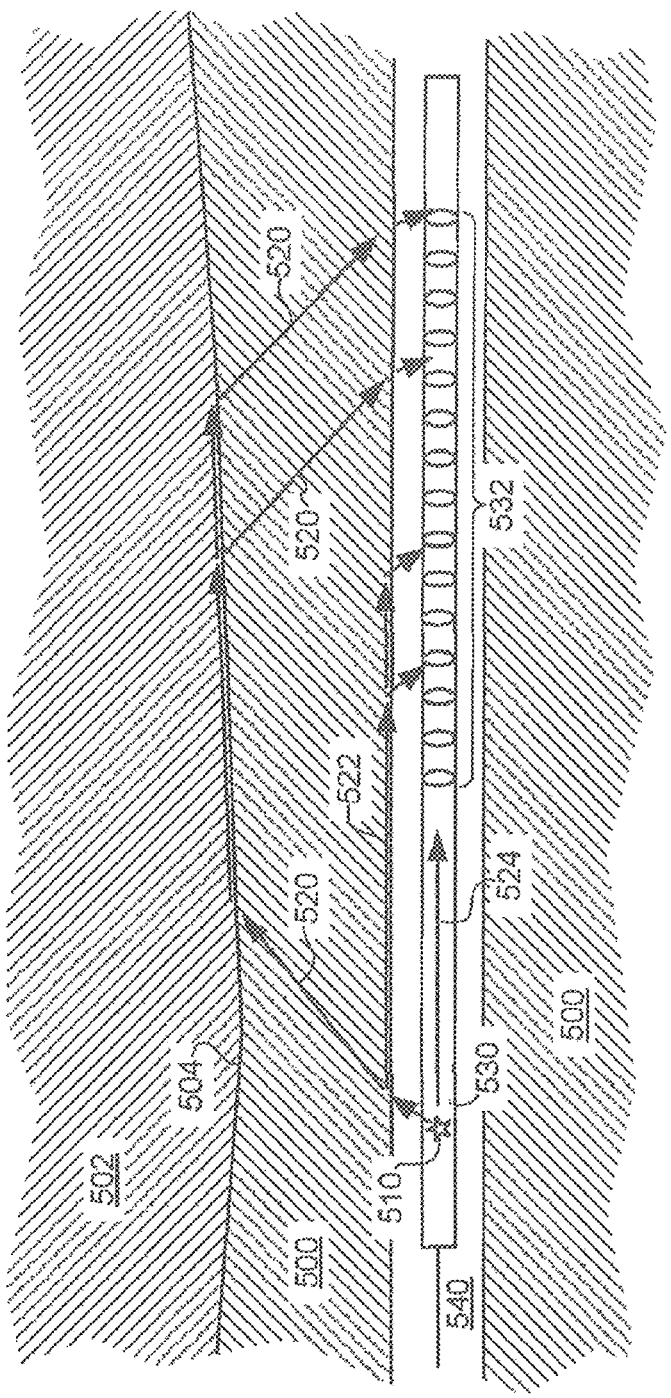
FIG. 6A illustrates the downhole measurement of refracted energy by a tool in a borehole.

FIG. 6A illustrates the downhole measurement of refracted energy by a tool in a borehole. Borehole 540 lies entirely within subterranean rock formation 500 having a first propagation velocity $v_1$. A nearby rock formation 502 has a propagation velocity $v_2$ and is separated from formation 500 by interface 504. Furthermore, in this example, $v_2 > v_1$. Tool 530 lies within borehole 540. The tool 530 can be a wireline deployed tool, or it can be deployed via different means such as via coiled tubing, or on a drill collar during a drilling operation. Acoustic source 510 is disposed on tool 530 as shown and generates acoustic energy. The acoustic energy travels along several ray paths corresponding to different propagation modes. The tool mode propagates along the body of the tool as shown by ray path 524. A compressional headwave propagates along the borehole wall, as shown by ray path 522. The energy refracted by interface 504 travels along through formation 500 towards interface 504, along interface 504 and then back through formation 500 towards a receiver array 532 as shown by ray paths 520.

As shown in FIG. 6A, when another formation with a higher compressional velocity is located close to the borehole, an additional headwave is generated on the interface between the two formations. For receivers close to the source, the headwave on the borehole wall arrives first. However it has been found that at greater source-receiver separations the headwave propagating along the interface between formations is detected first. The arrival time and moveout across the array can be analyzed to determine the distance from the borehole to the boundary 504 between the formations.

Figure 6C:
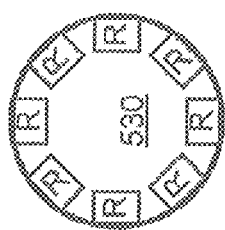
FIGS. 6B and 6C are examples of cross-sections of the tool shown in FIG. 6A.
Figure 6B:
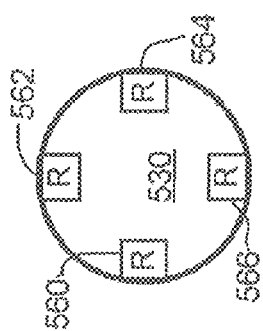

FIGS. 6B and 6C are example cross-sectional views of the tool shown in FIG. 6A. In FIG. 6B, four receivers 560, 562, 564 and 566 are located at each receiver station, thereby giving azimuthal resolution to the refracted acoustic energy data. FIG. 6C shows an arrangement of eight azimuthally distributed receivers for each receiver station in the array 532 (as shown in FIG. 6A), thereby providing greater azimuthal resolution.

Figure 7A:
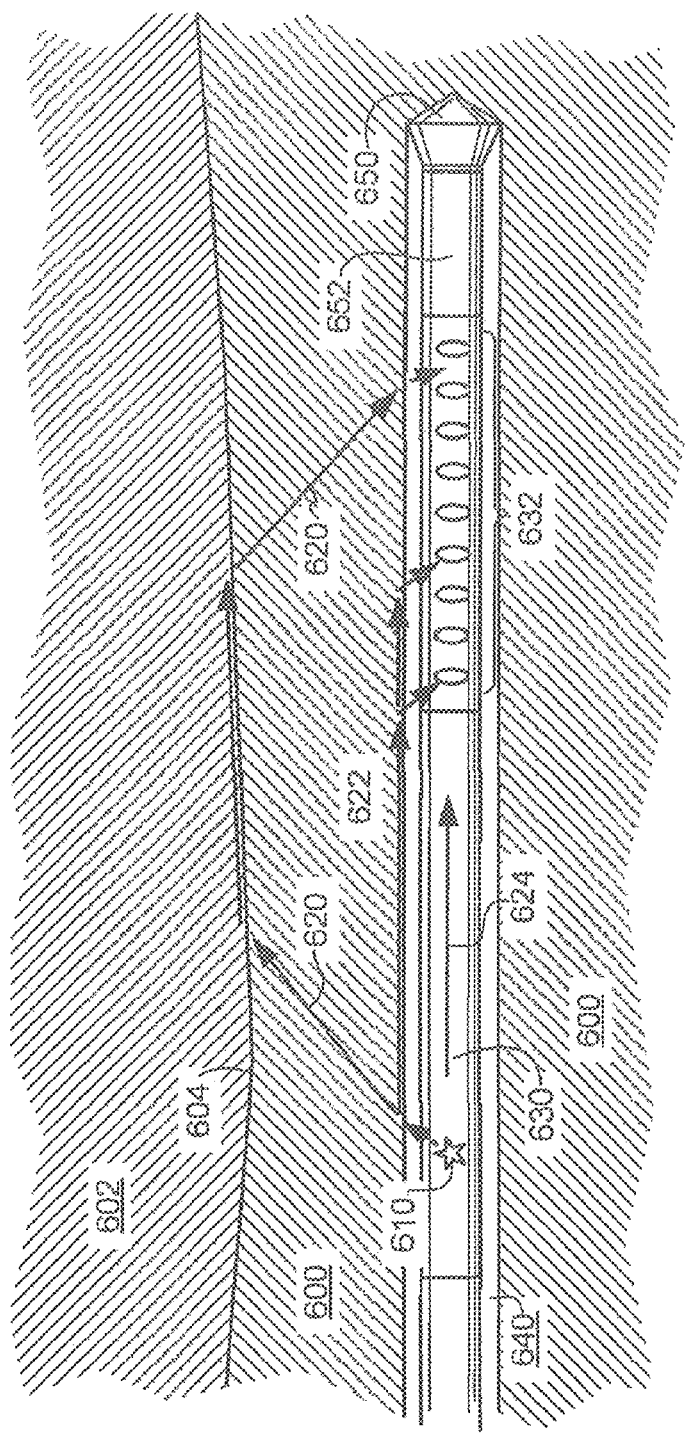
FIG. 7A illustrates the downhole measurement of refracted energy by a LWD tool in a borehole during a drilling operation.

FIG. 7A illustrates the downhole measurement of refracted energy by an LWD tool in a borehole during a drilling operation. Borehole 640 lies entirely within subterranean rock formation 600 having a first propagation velocity $v_1$. A nearby rock formation 602 has a propagation velocity $v_2$ and is separated from formation 600 by interface 604. As in the example of FIG. 6A, in this example $v_2 > v_1$. Bottom hole assembly 630 lies within the borehole 640 and includes drill bit 650 and roto-steerable subsystem 652. The roto-steerable subsystem 652 provides directional drilling and geosteering in response to analysis of the refracted energy measurements. Alternatively, the subsystem 652 could include a mud motor and bent sub to provide directional drilling capability. Acoustic source 610 is disposed on the assembly 630 as shown and generates acoustic energy. The acoustic energy travels along several ray paths corresponding to different propagation modes. The tool mode propagates along the body of the tool as shown by ray path 624. A compressional headwave propagates along the borehole wall, as shown by ray path 622. The energy refracted by the interface 604 travels along through formation 600 towards the interface 604, along the interface 604 and then back through the formation 600 towards a receiver array 632 as shown by ray paths 620. Although the receiver array 632 is shown closer to the drill bit 650 than the source 610, in an alternative example, the receiver array 632 is positioned farther away from the drill bit 650 than the source 610 to reduce the amount of noise received from the drill bit 650.

Figure 7B:
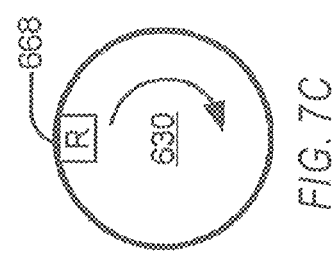
FIGS. 7B and 7C are cross-sectional views of the LWD tool shown in FIG. 7A.
Figure 7C:
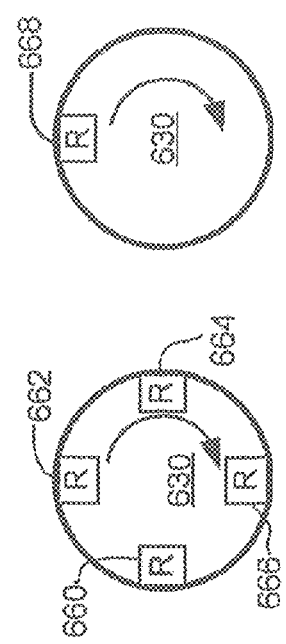

FIGS. 7B and 7C are examples of cross-sections of the LWD tool shown in FIG. 7A. In FIG. 7B, four receivers 660, 662, 664 and 666 are located at each receiver station, thereby giving azimuthal resolution to the refracted acoustic energy data. However, due to the rotation of the drill collar during a drilling operation, additional azimuthal resolution can be obtained by making measurements while the collar is rotated to different positions. For example, FIG. 7C shows an arrangement including only a single receiver for each receiver station. Azimuthal resolution is provided by making measurements at different rotational positions of the drill collar.

The near borehole structures can be analyzed by processing the event signals contained in the sonic data. As seen in images from resistivity tools, there can be a lot of objects which reflect and transmit the waves in measurement intervals. However, they can be hardly found because the direct phases in the waveforms are overwhelming and cover the event signals. To extract the weak event signals, the direct phases must be accurately estimated and subtracted.

In aforementioned conventional COG, the arrivals and amplitudes of direct phases are quite similar in adjacent traces unless there are sharp lithological changes because the distance between the source and receiver is constant and phases are traveling through a common formation (i.e., traveltimes, geometrical spreading and attenuation are common). Therefore the wavefield separation in COG can be accurate because the errors of amplitude estimations can be minimized. However, filters in COG erase the event signals from the reflectors parallel to a well because these signals do not have moveout (i.e., parallel to direct phases). To obtain theses signals, filters in CSG or CRG are necessary even though there is a difficulty in estimation of amplitudes of direct phases.

To obtain further accuracy of estimation of direct phases, cross-correlation is used to estimate the time delay of phase arrival. Even within a short interval, the arrival times can be different because of existences of small changes of formation properties, tool positions from the center of hole and hole conditions. These delays can degrade the estimation of direct phases.

In the presented estimation method and system in the disclosure herein, cross-correlation is used to adjust phase arrivals over adjacent waveform traces to improve the accuracy of estimation, as described hereinafter. The presented method and system in the disclosure herein is also robust to the sharp lithological changes.

[Estimation of Direct Phases in COG Cases]

To extract event signals from observed waveforms, the direct phases are estimated and subtracted. At first, an estimation method of direct phases for COG cases is shown as follows. The waveforms are modeled as $$s(j\Delta t, k\Delta x) = \sum_{i=1}^{N} a_i(k\Delta x) p_i(j\Delta t + \delta t_i(k\Delta x)) + e(j\Delta t, k\Delta x) + n(j\Delta t), \quad (1)$$

where $s(j\Delta t; k\Delta x)$ is a sample of waveforms at time, $j\Delta t$, and a sensor location, $k\Delta x$, $\Delta t$ and $\Delta x$, and $j$ and $k$ are temporal and spatial increments and indices, respectively, $i$ is the index of direct phase, $N$ is the number of direct phases, $p_i(t)$ is the signal train of i-th phase, $\delta t_i(x)$ is the time difference of phase arrival to a reference time at the location, $x$, $e(j\Delta t, k\Delta x)$ is the event signal, which has a rapid moveout, and $n(j\Delta t)$ is the zero mean random noise. The direct phases at $x=k\Delta x$ is estimated as expressed by $$s_D(j\Delta t, k\Delta x) = \sum_{i=1}^{N} a_i(k\Delta x) p_i(j\Delta t), \quad (2)$$

using traces at adjacent sensor locations. Here $\delta t_i(k\Delta x)=0$ without any loss of generality is assumed. It is also assumed that each phase does not overlap as $$p_p(j\Delta t+\delta t_p(k\Delta x)) p_q(j\Delta t+\delta t_q(k\Delta x))=0 \quad (3)$$

for $p \ne q$. The estimation is given by $$\overline{s_D}(j\Delta t, k\Delta x) = \frac{1}{M_L + M_R} \sum_{l=-M_L, l\ne 0}^{M_R} \hat{s}(j\Delta t, (k+l)\Delta x) \quad (4)$$

$$\sim \frac{1}{M_L + M_R} \sum_{l=-M_L, l\ne 0}^{M_R} \quad (5)$$

$$\sum_{i=1}^{N} a_i((k+l)\Delta x) p_i(j\Delta t),$$

where $\hat{s}(j\Delta t, (k+l)\Delta x)$ is the waveforms which is time corrected as $$\hat{s}(j\Delta t, (k+l)\Delta x) = \sum_{i=1}^{N} a_i((k+l)\Delta x) p_i(j\Delta t) + \quad (6)$$

$$e(j\Delta t - \delta t_p((k+l)\Delta x), (k+l)\Delta x) + n(j\Delta t - \delta t_p((k+l)\Delta x)),$$

where $M_L$ and $M_R$ are the numbers of traces for $l<0$ and $l>0$, which satisfies $M_L+M_R=2M$, respectively. $M_L$ and $M_R$ are determined by using cross-correlation as described in the next section. Here the following condition is assumed as $$\frac{1}{M_L + M_R} \sum_{l=-M_L, l\ne 0}^{M_R} \{n(j\Delta t - \delta t_p((k+l)\Delta x)) + \quad (7)$$

$$e(j\Delta t - \delta t_p((k+l)\Delta x), (k+l)\Delta x)\} \ll \overline{s_D}(j\Delta t, k\Delta x)$$

from the definitions of $e(t, x)$ and $n(t)$. If the location dependency of $a_i(k\Delta x)$ is not negligible, the polynomial fitting may be used by minimizing $$G(A_0, A_1, \ldots, A_M) = \sum_{l=-M_L, l\ne 0}^{M_R} \left| \hat{s}(j\Delta t, (k+l)\Delta x) - \sum_{l=0}^{L} A_l (l\Delta x)^l \right|^2 \quad (8)$$

where $A_l$ is the coefficients of polynomial and $L$ is the order of polynomial. In this case, the estimation is given by $$\sum_{i=1}^{N} a_i(k\Delta x) = A_0. \quad (9)$$

Note that if the polynomial fitting is used, there are approximation errors of $a_i(k\Delta)$. Therefore the quality of estimation becomes lower.

[Cross-Correlation and Time Correction] Cross-Correlation:

To estimate the time differences of phase arrivals, cross-correlation is used. The cross-correlation of two traces is expressed by $$F(f(t), g(t); T_f, T_g) = \qquad (10)$$

$$\frac{\sum_{k=1}^{N} f(T_f + (k-M-1)\Delta t) g(T_g + (k-M-1)\Delta t)}{\sqrt{\sum_{k=1}^{N} f^2(T_f + (k-M-1)\Delta t)} \sqrt{\sum_{k=1}^{N} g^2(T_g + (k-M-1)\Delta t)}},$$

where f(t) and g(t), and $T_f$ and $T_g$ are the traces and central times of cross-correlation, respectively. $\Delta t$ is the sampling period, N is the number of points to compute the cross-correlation and M is the number of points to define the half window of cross-correlation. N and M are given by $$M = \left\lfloor \frac{C_1}{2f_c \Delta t} \right\rfloor, \qquad (11)$$

$$N = 2M + 1 \qquad (12)$$

where $f_c$ is the central frequency of source wavelet, $C_1$ is a constant, and $\lfloor \cdot \rfloor$ shows the floor function. The relative time difference of phase arrival, $\delta_{fg}$, is estimated using cross-correlation so that $$F(f(t), g(t); T_f, T_g + \delta t_{fg}) = \max_{|\delta t| < C_2} F(f(t), g(t); T_f, T_g + \delta t), \qquad (13)$$

where $C_2$ is a constant. As $F(f(t), g(t); T_f, T_g+\delta t)$ is estimated on discrete points, $\delta_{fg}$ is estimated using weighted average as $$\delta_{fg} = l_g \Delta t + \frac{\sum_{k=-1}^{1} k F(f(t), g(t); T_f, l_g \Delta t + k\Delta t)}{\sum_{k=-1}^{1} F(f(t), g(t); T_f, l_g \Delta t + k\Delta t)} - T_g \qquad (14)$$

where $l_g \Delta t$ is the time on a discrete time sample that maximizes cross-correlation.

Time Correction:

$f_i(t)$ denotes $s(t, i\Delta x)$ where i and $\Delta x$ are the index and the interval of receiver positions, respectively. Time shift is successively applied and cross-correlation is computed for the time shifted traces. In cases of i<j and i>j, the time shift is applied to the j-th index trace as $$g_j(T_i) = \begin{cases} f_j(T_i) & (j = i+1) \\ f_j\left(T_i + \sum_{p=i+1}^{j-1} \delta t_{ip}\right) & (j > i+1) \end{cases} \qquad (15)$$

and $$g_j(T_i) = \begin{cases} f_j(T_i) & (j = i-1) \\ f_j\left(T_i + \sum_{p=j+1}^{i-1} \delta t_{ip}\right) & (j < i-1) \end{cases} \qquad (16)$$

respectively. The time difference $\delta t_{ij}$ is by maximizing F $(f_i(t), g_j(t); T_i; T_i+\delta t_{ij})$. The time shifted traces are written by $$h_j(T_i) = \begin{cases} f_j\left(T_i + \sum_{p=i+1}^{j} \delta t_{ip}\right) & (j > i) \\ f_j\left(T_i + \sum_{p=j}^{i-1} \delta t_{ip}\right) & (j < i) \end{cases} \qquad (17)$$

Cross-correlation of $f_i(t)$ with the time shifted trace $h_j(t)$ is obtained by $$C_{ij} = F(f_1(t), h_j(t); T_i, T_i). \qquad (18)$$

$M_L$ and $M_R$ are selected so that $$M_L + M_R = 2M, \qquad (19)$$

$$C_{ij} > C_L (-M_L \le j \le M_R), \qquad (20)$$

and $|M_L - M_R|$ becomes the minimum.

[Estimation of Direct Phases in CSG and CRG Cases]

In CSG and CRG cases, the estimations of the direct phases are assumed to be expressed by $$s_D(j\Delta t, k\Delta x) = \sum_{i=1}^{N} s_{Di}(j\Delta t, k\Delta x) \qquad (21)$$

where $s_{Di}(j\Delta t, k\Delta x)$ is the estimation of i-th phase estimated using the time corrections. The time corrected trace, $s'_i(j\Delta t, k\Delta x)$, is expressed by $$s'_i(j\Delta t, k\Delta x) = s(j\Delta t - \tau_i(k\Delta x), k\Delta x) \qquad (22)$$

where $$\tau_i(k\Delta x) = s_i \cdot k\Delta x, \qquad (23)$$

where $s_i$ is the slowness of the i-th phase. The slowness is estimated, for example, using the method of Kimball and Maretta (1984) as described in the document of Kimball, C. V., and T. L. Maretta, 1984, "Semblance processing of borehole acoustic array data": Geophysics, 49, pp. 274-281, the content of which is incorporated herein in its entirety by reference thereto. Here it is assumed that k is indexed from the closest receiver to the source. From $s'_i(j\Delta t, k\Delta x)$, $s'_{Di}(j\Delta t, k\Delta x)$ is estimated using equations 7 and 8. $s_{Di}$ is obtained by $$s_{Di}(j\Delta t, k\Delta x) = s'_{Di}(j\Delta t + \tau_i(k\Delta x), k\Delta x), \qquad (24)$$

and substituted in the foregoing Equation 21.

[Additional Filter]

In the present estimation method and system in the disclosure herein, f-k filter may be applied to remove unwanted signals such as reflected Stoneley waves, as described in the foregoing document of Hornby (1989). For migration, only up-going or down going waves may be also selected by the f-k filter as described in the foregoing document of Li et al. (2002).

Figure 8:
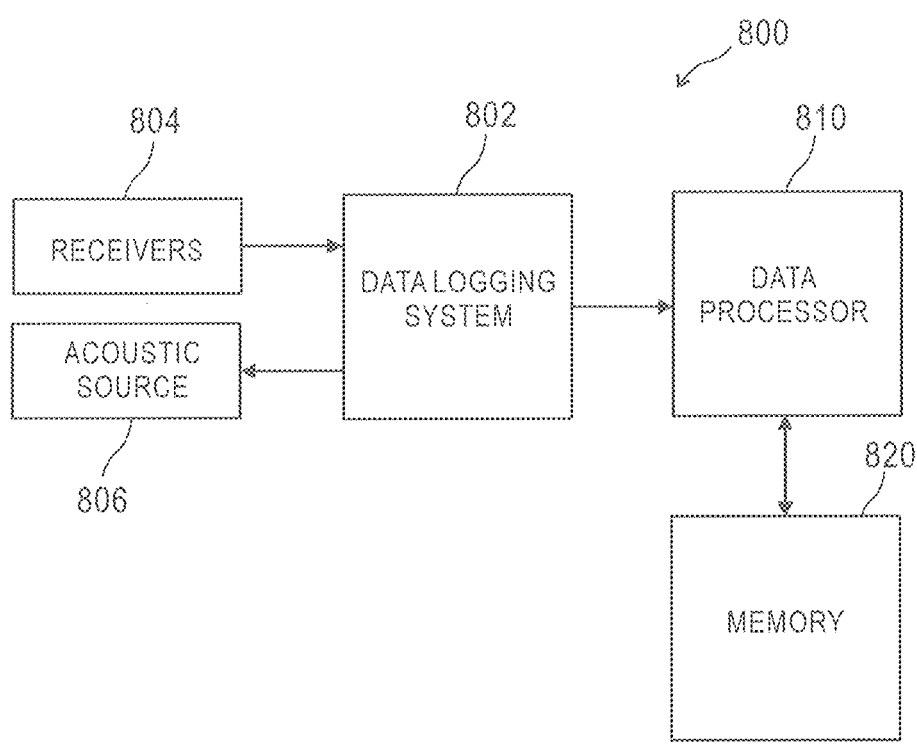
FIG. 8 shows a schematic block diagram showing one example of a system for performing a wavefield separation of sonic data using cross-correlation according to embodiments of the disclosure.

Referring to FIG. 8, the system 800 to perform a wavefield separation of sonic data using cross-correlation comprise a data logging system 802, acoustic receivers (vibration sensors) 804 located in the wellbore, an acoustic source 806 of generating vibrations to be received with the receivers 804, a data processor 810 such as a computer apparatus, and a memory 820. For example, the data logging system 802 may comprise one or more modules in the foregoing tool and tubing/cable. The receivers 804 such as the downhole array of multiple receivers or the DVS may be installed in the foregoing tool and coupled with the data logging system 802 via the tubing/cable. The acoustic source 806 such as the foregoing one or more sources may be coupled with the data logging system 802 so that the generation of vibrations can be controlled. The acoustic waves detected with the receivers 804 may be transmitted to the data logging system 802 via the tubing/cable and the data logging system 802 may produce a data log of acoustic waves (vibrations) received at the receivers 804. The data processor 810 may be coupled with the data logging system 802 via a cable or a network so as to be received the data log from the data logging system 802. The data processor 810 may be implemented by one or more circuit(s), programmable processor(s), application specific integrated circuit(s) (ASIC(s)), programmable logic device(s) (PLD(s)) and/or field programmable logic device(s) (FPLD(s)), etc. The data log may be transferred from the data logging system 802 to the data processor 810 via a storage medium such as a USB memory, a memory card, a magnetic tape or disk, an optical disk, etc. The data processor 810 may be also installed within the data logging system 802. The sonic data such as waveforms are temporarily or permanently stored in the memory 820 which is a tangible computer readable medium such as a memory, digital versatile disk (DVD), compact disk (CD), etc. Software and/or firmware including instructions for processing the sonic data are also stored in the memory.

Figure 9:
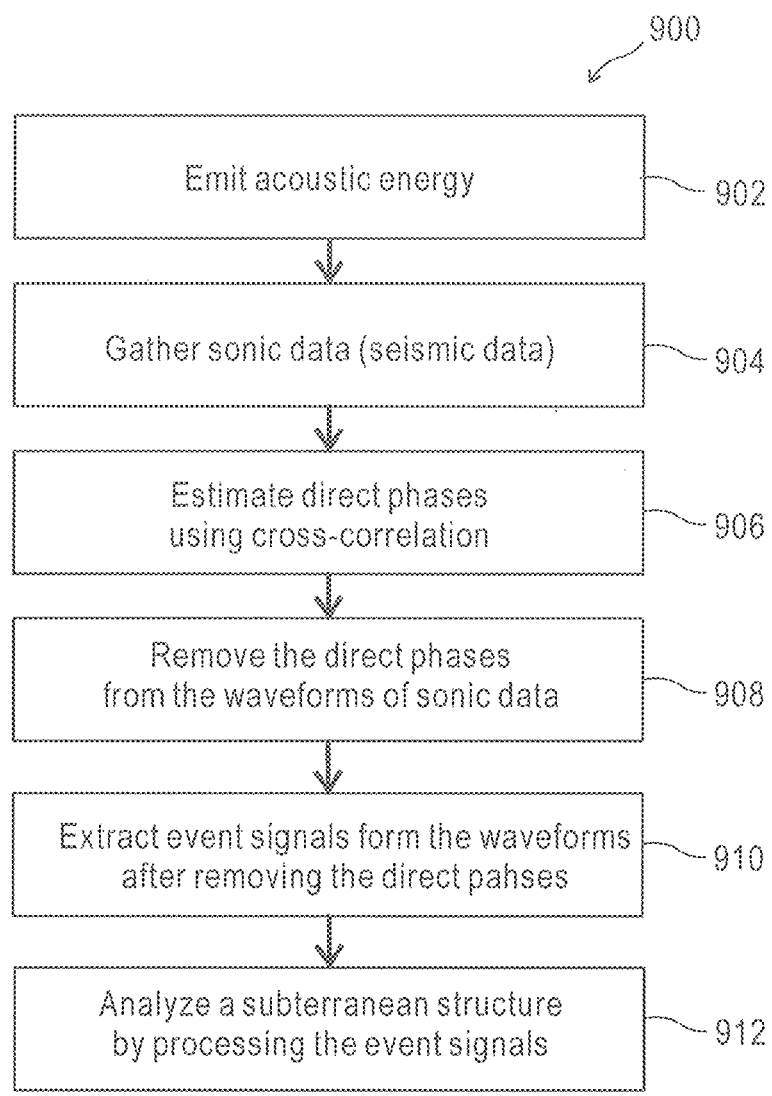
FIG. 9 is a flowchart showing one example of wavefield separation processes of sonic data using cross-correlation according to the disclosure herein.

FIG. 9 shows a flowchart showing one example of wavefield separation processes of sonic data using cross-correlation according to the disclosure herein. In FIG. 9, the processing 900 begins execution at block 902, at which the system 800 emits acoustic energy, for example, in the form of acoustic waveforms (rays) by acoustic sources of a sonic tool or the transmitters 510, 610 described above.

At block 904, after the waveforms (rays) are reflected off of portions of the subterranean formation including, for example, portions of one or more dipping structure(s) such as fracture(s), the system 800 gathers sonic data (seismic data) from the reflected waveforms (rays) by acoustic receivers in the sonic tool or the receivers 560, 562, 564, 566, 660, 662, 664, 666, 668 described above and sent to, for example, an input receiver of the data logging system 802 and data processor 810 for recordation and processing. The sonic data is recorded by the sonic tool that has, for example, 8 azimuthal arrays of 13 receivers at 45-degree intervals. The minimum distance between the source and receiver may be 7 ft and the receivers may be located at 0.5 ft intervals. A monopole source of 8 kHz central frequency may be used for the data acquisition.

At block 906, the system 800 executes data processing for estimating direct phases of the waveforms of sonic data using cross-correlation according to the present method in the disclosure herein, and at block 908, for removing the direct phases from the waveforms of sonic data. Then at block 910, the system 800 executes data processing for extracting event signals from the waveforms after removing the direct phases.

As shown at block 912, the system 800 may execute data processing for analyzing a subterranean structure such as a formation structure near a borehole by processing the event signals.

Figure 10A:
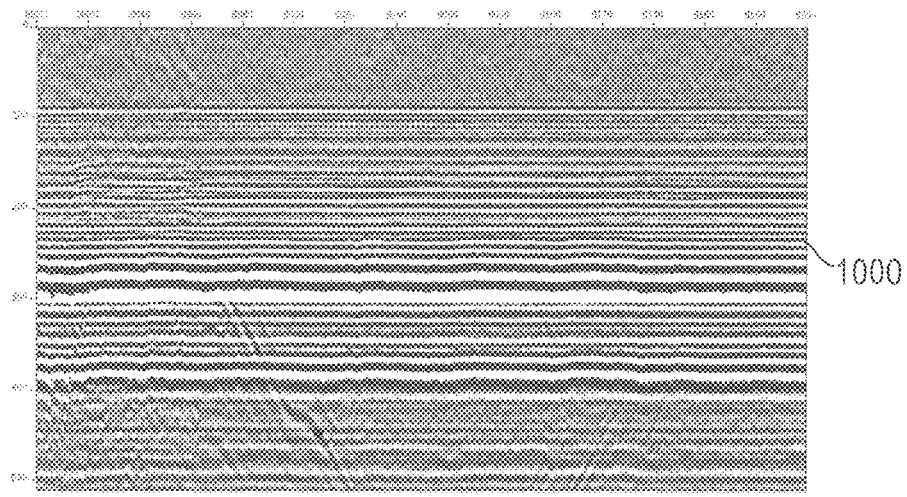
FIG. 10A shows one example of raw waveforms of sonic data.
Figure 10B:
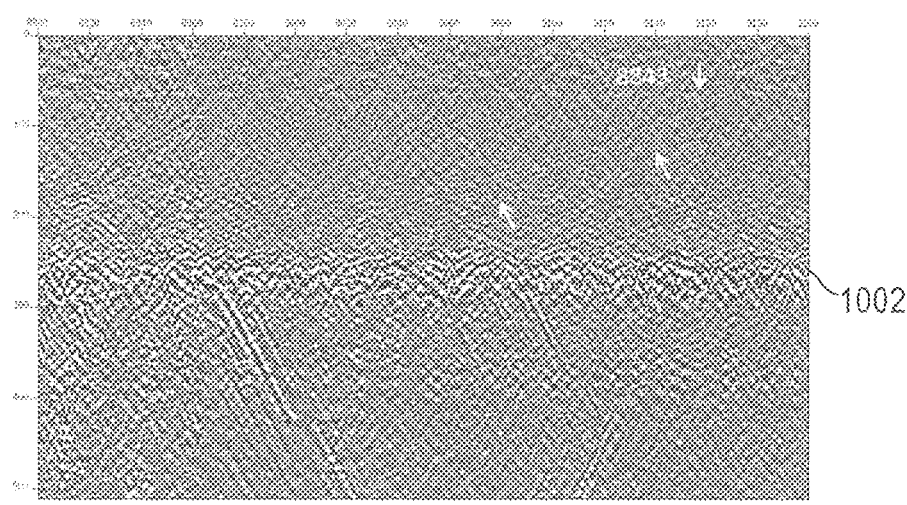
FIG. 10B shows one example of waveforms filtered by the improved method using the cross-correlation according to embodiments of the disclosure.

FIG. 10A shows a comparative example of raw waveforms 1000 of sonic data after stacking which are obtained by a monopole model after stacking, and FIG. 10B shows one example of waveforms filtered by processing the raw waveforms with the improved method using the cross-correlation according to embodiments of the disclosure. The sonic data are measured at depth range of 8812-8846 ft. As shown in FIG. 10B, the event signals can be clearly found as indicated white arrows in the filtered waveforms 1002 obtained by the present method. In the other hand, no clear event signal is found in the raw waveforms 1000 in FIG. 10A.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words 'means for' together with an associated function.

According to one embodiment of this disclosure, the comparatively less expensive materials can be modified to exhibit required properties of strength and corrosion resistance sufficient to either equal or exceed current requirements for service.

The preceding description has been presented only to illustrate and describe certain embodiments. It is not intended to be exhaustive or to limit the disclosures to any precise form disclosed. Many modifications and variations are possible in light of the above teaching.

The embodiments and aspects were chosen and described in order to best explain principles of the disclosures and its practical applications. The preceding description is intended to enable others skilled in the art to best utilize the principles in various embodiments and aspects and with various modifications as are suited to the particular use contemplated. It is intended that the scope of the disclosures be defined by the following claims.

What is claimed is:

1. A method for wavefield separation of sonic data, the method comprising:
    estimating direct phases of waveforms of sonic data observed with two or more sensors by using cross-correlation of waveform traces at adjacent sensor locations;
    removing the direct phases from the observed waveforms; and
    extracting event signals from the waveforms after removing the direct phases;
    wherein the direct phases of waveforms are approximated by polynomial fitting.

2. The method according to claim 1, further comprising:
    estimating time differences of phase arrivals to a reference time using cross-correlation of the waveform traces; and
    estimating the direct phases of waveforms based on the time differences of phase arrivals.

3. The method according to claim 2, wherein the time differences of phase arrivals are estimated by successively applying time shift to the waveform traces and computing cross-correlation for the time shifted waveform traces.

4. The method according to claim 1, further comprising applying a k-f filter to remove unwanted signals from the waveforms.

5. The method according to claim 1, further comprising applying a k-f filter to select up-going or down-going waves from the waveforms.

6. The method according to claim 1, further comprising analyzing a subterranean structure near a borehole by processing the event signals.

7. A system for wavefield separation of sonic data, the system comprising:
a memory to record sonic data and a processor used to:
estimate direct phases of waveforms of sonic data observed with two or more sensors by using cross-correlation of waveform traces at adjacent sensor locations;
remove the direct phases from the observed waveforms; and
extract event signals from the waveforms after removing the direct phases;
wherein the direct phases of waveforms are approximated by polynomial fitting.

8. The system according to claim 7, wherein the processor is used further to:
estimate time differences of phase arrivals to a reference time using cross-correlation of the waveform traces; and
estimate the direct phases of waveforms based on the time differences of phase arrivals.

9. The system according to claim 8, wherein the time differences of phase arrivals are estimated by successively applying time shift to the waveform traces and computing cross-correlation for the time shifted waveform traces.

10. The system according to claim 7, wherein the processor is further used to apply a k-f filter to remove unwanted signals from the waveforms.

11. The system according to claim 7, wherein the processor is further used to apply a k-f filter to select up-going or down-going waves from the waveforms.

12. The system according to claim 9, wherein the processor is further used to analyze a subterranean structure near a borehole by processing the event signals.

* * * * *